US009862331B1

(12) United States Patent
Libon et al.

(10) Patent No.: US 9,862,331 B1
(45) Date of Patent: Jan. 9, 2018

(54) COMBINATION EQUIPMENT CARRIER FOR AUTOMOBILES

(71) Applicant: BEAR-LOCK USA, LLC, Carson City, NV (US)

(72) Inventors: Arseny Libon, Brooklyn, NY (US); Joseph Bouganim, Brooklyn, NY (US); Ilona De Jongh, New York, NY (US)

(73) Assignee: BEAR-LOCK USA, LLC, Carson City, NV (US)

( * ) Notice: Subject to any disclaimer, the term of this patent is extended or adjusted under 35 U.S.C. 154(b) by 80 days.

(21) Appl. No.: 14/886,504

(22) Filed: Oct. 19, 2015

Related U.S. Application Data

(60) Provisional application No. 62/065,520, filed on Oct. 17, 2014.

(51) Int. Cl.
*B60R 9/10* (2006.01)
*B60R 9/08* (2006.01)
*B60R 9/06* (2006.01)
*B60R 9/12* (2006.01)

(52) U.S. Cl.
CPC .............. *B60R 9/08* (2013.01); *B60R 9/06* (2013.01); *B60R 9/10* (2013.01); *B60R 9/12* (2013.01)

(58) Field of Classification Search
CPC ............ B60R 9/06; B60R 9/08; B60R 9/10
USPC ................ 224/523, 532, 536, 924
See application file for complete search history.

(56) References Cited

U.S. PATENT DOCUMENTS

| 3,004,359 | A  |   | 11/1958 | Pisciotta |           |
|-----------|----|---|---------|-----------|-----------|
| 5,195,670 | A  | * | 3/1993  | Piretti   | B60R 9/06 |
|           |    |   |         |           | 16/324    |
| 5,255,164 | A  |   | 10/1993 | Eidelman  |           |
| 5,641,108 | A  | * | 6/1997  | Ewer      | B60R 9/06 |
|           |    |   |         |           | 224/502   |
| 6,018,295 | A  |   | 1/2000  | Jewell et al. |       |
| 6,286,738 | B1 | * | 9/2001  | Robins    | B60R 9/06 |
|           |    |   |         |           | 224/314   |
| 6,616,312 | B2 |   | 9/2003  | Carter    |           |
| 6,919,800 | B2 |   | 7/2005  | Wu        |           |
| 7,095,318 | B1 |   | 8/2006  | Bekhor    |           |
| 2002/0117524 | A1 | * | 8/2002 | Jeong   | B60R 9/06 |
|           |    |   |         |           | 224/314   |
| 2010/0181357 | A1 | * | 7/2010 | Christianson | B60R 9/06 |
|           |    |   |         |           | 224/497   |
| 2012/0031941 | A1 | * | 2/2012 | Shen    | B60R 9/048 |
|           |    |   |         |           | 224/555   |

(Continued)

*Primary Examiner* — Justin Larson
*Assistant Examiner* — Phillip Schmidt
(74) *Attorney, Agent, or Firm* — Lawrence G. Fridman, Esq.; Feigin & Fridman, LLC

(57) ABSTRACT

A combination carrier adapted to be mounted at a rear of a vehicle consists of an upper frame and a lower frame interconnected by a transverse connecting element. The upper frame is formed by first and second upper arms. The lower frame is formed by first and second lower arms. The first upper arm, the first lower arm; the second upper arm and the second lower arm are pivotably connected to each other at respective first and second hubs. A proximal support assembly is movably arranged at the first hub at the junction between the first upper arm and the first lower arm. The distal support assembly is movably arranged at the second hub at the junction between the second upper arm and the second lower arm.

16 Claims, 8 Drawing Sheets

(56) References Cited

U.S. PATENT DOCUMENTS

2015/0231780 A1* 8/2015 Hirokawa ............ B25H 1/0014
                                                              224/518

* cited by examiner

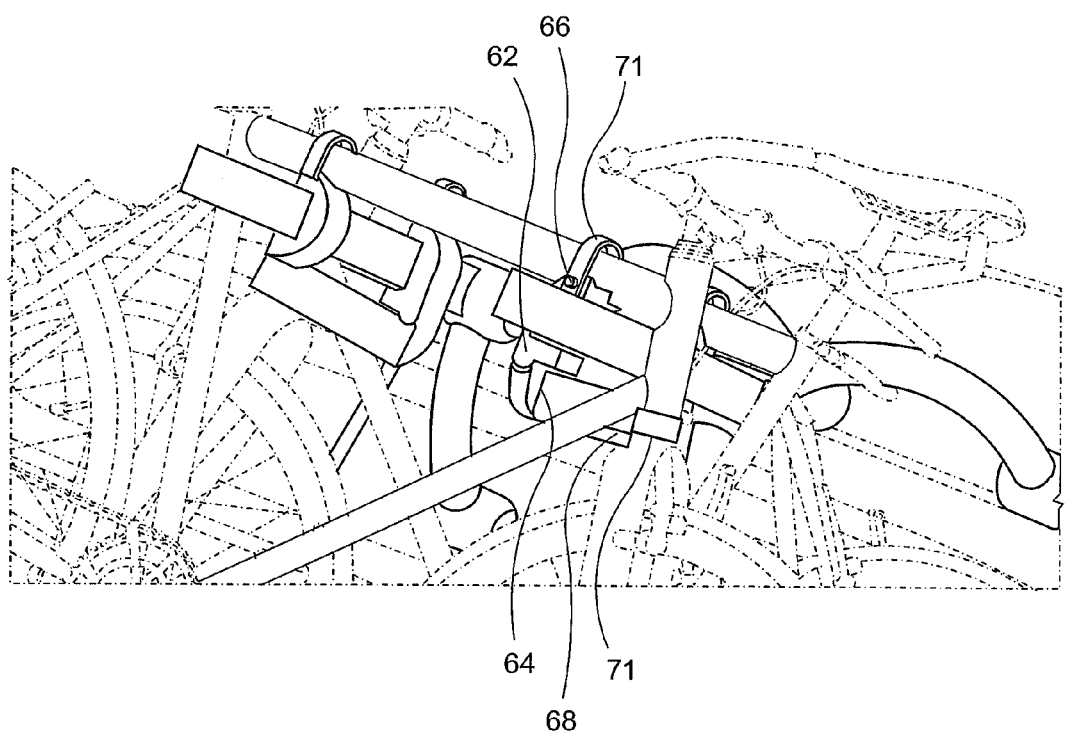
F I G. 7

COMBINATION EQUIPMENT CARRIER FOR AUTOMOBILES

REFERENCE TO RELATED APPLICATION

This Application claims priority of U.S. Provisional Application Ser. No. 62/065,520 filed by the inventors on Oct. 17, 2014, the entire disclosure of which is hereby incorporated by reference.

FIELD OF THE INVENTION

The present invention relates to the field of carriers for attachment to exterior of automobiles and more specifically it is directed to a combination carrier adapted for removable mounting to the rear of a vehicle for carrying bicycles or skis and/or snow boards.

BACKGROUND OF THE INVENTION

Recreational equipment, such as skis, snow boards and bicycles, are often transported by a motor vehicle. With the recent growth and development of recreational biking, bicycle riding is not only a means for traveling to a destination, but a recreational goal in itself. The frequent bicyclist finds a routine need for convenient bicycle transport in the family vehicle to bike trails and bike sporting events. Only a limited number of substantial trucks and cars can conveniently accommodate bicycle, snow board or skis in the passenger compartment or trunk, and even then space for luggage and passengers is compromised. To address the need for convenient exterior transportation of skis, snow boards, bicycles, etc., the carrier or transportation rack of the invention has been developed.

SUMMARY OF THE INVENTION

The invention provides a vehicle-mounted equipment carrier enabling a user to mount one or more items of equipment, such as bicycles, skis, snowboards, etc., to a vehicle for transportation purposes. The invention is formed to accommodate a desire of the user to tailor the configuration of the carrier according to the type of vehicle to which the carrier is to be mounted. The equipment carrier of the invention includes at least the following embodiments: a trunk or rear-mounted embodiment, hitch-mounted embodiment, etc. The invention provides a carrier arrangement in which both the configuration of the frame as well as the position of the support members can be adjusted according to the configuration of the vehicle.

It is an object of the present invention to provide an equipment carrier in which the configuration of the equipment carrier can be quickly and easily altered according to the configuration of the vehicle to which the equipment carrier is to be mounted.

It is a further object of the invention to provide such an equipment carrier which is movable between various extended position for providing use of the carrier, and an inoperative collapsed position for storage.

Yet another object of the invention is to provide such an equipment carrier having a relatively small number of components, which results in a relatively inexpensive cost of manufacture. In this manner, an equipment carrier which is relatively simple in its components and construction, yet which is capable of being quickly and easily reconfigured for use or moved from one operational position to another.

Yet further object of the invention is to provide an equipment carrier which is mounted over the bumper and on the rear of the trunk lid of an automobile and attached to the vehicle by straps with hook elements at their ends.

In the invention elements of the carrier tend not to interfere with any equipment supported on the carrier frame. Potential scratching or otherwise damage of the automobile, bicycles, etc. is also prevented.

The carrier of the invention offers the convenience and economy of dual-purpose year-around use of the carrier, without the inconvenience and potential damage to bicycles, the skis and automobile. Further, the design of the carrier prevents improper mounting of the equipment to a vehicle, so as to prevent disengagement during road travel, minimizing loss of the equipment and possible accidents and injuries.

The present invention addresses the aforementioned need by providing a combination carrier for carrying equipment such as for example: skies, snow boards and bicycles and adapted for attachment to the exterior of an automobiles. The combination carrier is movable between an extended position in which the equipment is transported, and a retracted position in which the equipment is placed in storage.

BRIEF DESCRIPTION OF THE DRAWINGS

Referring now to the drawings which are provided to illustrate and not to limit the invention, wherein:

FIG. 7 is view similar to the view of FIG. 6; and

DETAILED DESCRIPTION OF THE INVENTION

Figure 1:
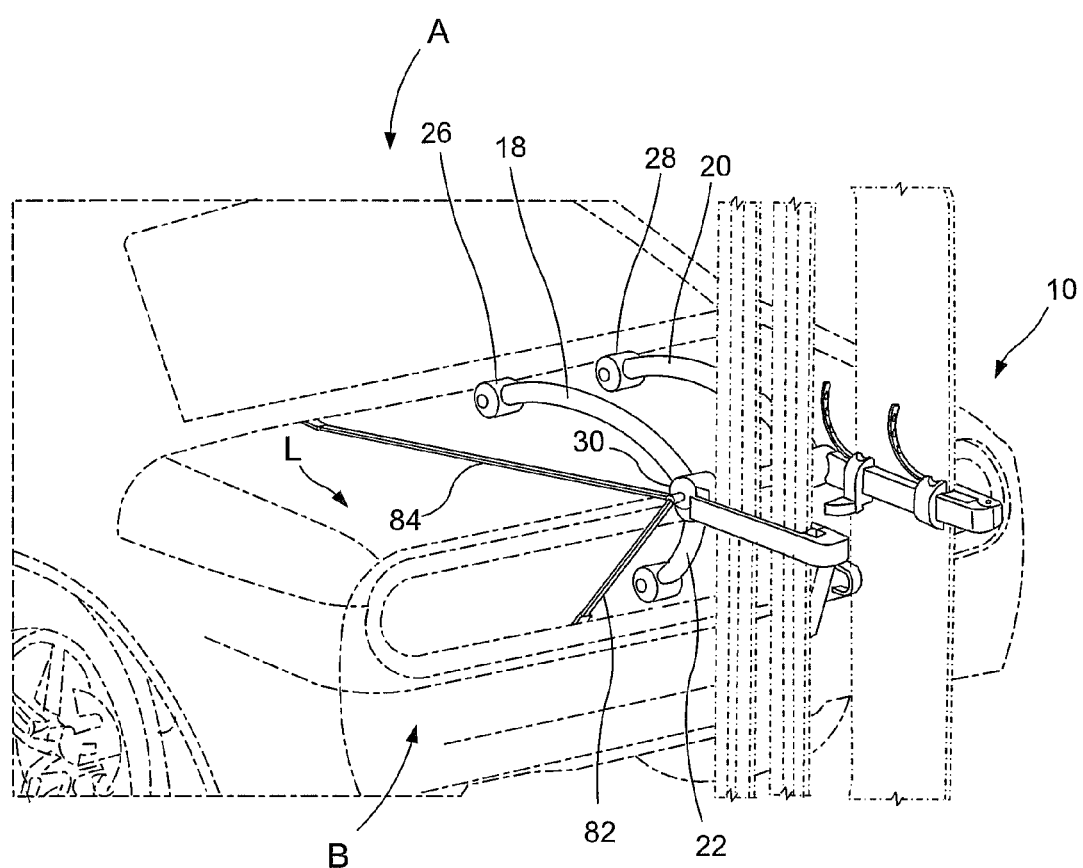
FIG. 1 is a perspective view showing an equipment carrier of the invention mounted at a rear part of a sedan.

Throughout the description, the terms "upper", "lower" "top" and "bottom" are used to describe the normal orientation of the components of the equipment carrier or rack 10 when in use. It is understood, however, that such terms are not intended to be limiting as to the manner in which the carrier 10 may be used. Rather, such terms are used for purposes of convenience in describing and understanding the relationship of the components of carrier 10 when employed in the manner illustrated in the drawings.

Figure 4:
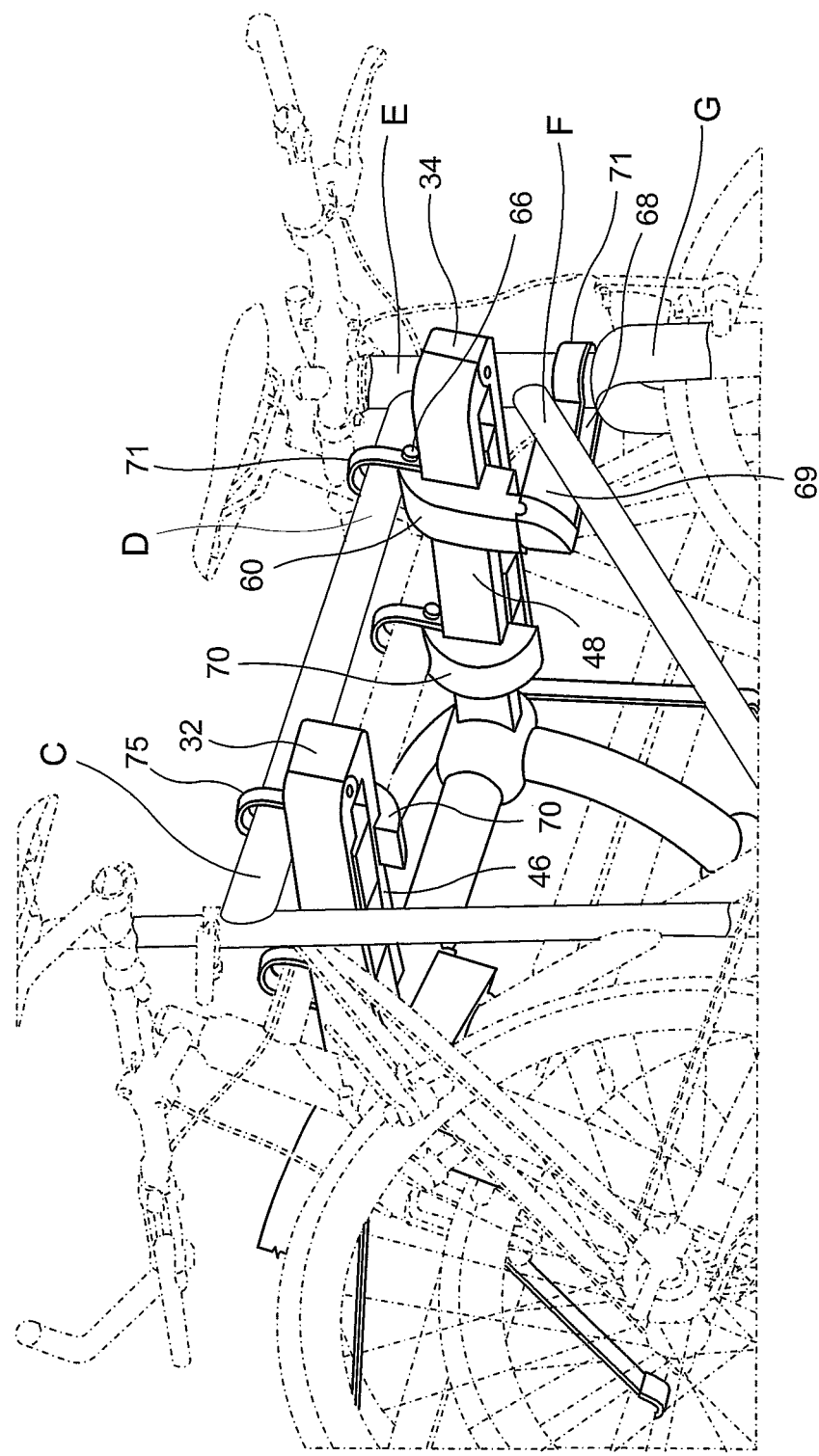
FIG. 4 is a view of the equipment carrier adapted for carrying of two bicycles.

With reference to the drawings wherein like numerals indicate like elements, FIG. 4 shows the rear portion of a typical automobile A with a rear bumper B and a trunk lid L.

The combination bicycle/ski carrier or rack of this invention is generally designated by the numeral 10 (see FIGS. 1-3, for example) and generally includes an upper frame 12 and a lower frame 14 interconnected by a transverse connecting element 16. A longitudinal axis A-A of the carrier passes through the connecting element 16. The upper frame 12 consists of spaced from each other first 18 and second 20 upper arms. In a similar fashion, the lower frame 14 consists of spaced from each other first 22 and second 24 lower arms. Each upper and lower arm extends between a connecting end and a free end thereof. Each arm is preferably tubular in construction and snugly mounted within the open upper or lower ends of the respective hub. The first upper arm 18 and the first lower arm 22 are pivotably connected to each other at a first hub assembly 30, whereas the second upper arm 20 and the second lower arm 24 are pivotably connected to each other at a second hub assembly 40. The hub assemblies are also adapted to receive respective ends of the transverse element 16.

To protect the surface finish of the vehicle against scratching by the carrier 10 resilient shock absorbing members 26 and 28 are mounted at the free ends of the upper and lower arms.

Although curved or arched-shaped configuration of the arms will be discussed with respect to the illustrated embodiments, it should be noted that any conventional configuration of arms is within the scope of the invention.

The arms 18, 20 of upper frame 12 and the respective shock absorbing members 26, 28 function to define an upper forward vehicle engagement area of the carrier 10 of the invention, which is adapted to engage an upper area of the vehicle. Similarly the anus 22, 24 of the lower frame 14 and the respective shock absorbing members 26, 28 function to define a lower forward vehicle engagement area of the carrier 10 of the invention, which is adapted to engage a lower area of the vehicle.

The hubs 30, 40 are essential components of the present invention and are configured to movably accommodate the respective upper and lower arms, as well as equipment support assemblies. The proximal support assembly 32 and distal support assembly 34 are movably connected to the respective hubs to mount and support equipment, such as bicycles, skies, snowboards, etc. The proximal support assembly 32 is movably arranged at and extends outwardly from the first hub 30 at an area of junction between the first upper arm 18 and the first lower arm 22. Similarly, the distal support assembly 34 extends outwardly from the second hub 40 at an area of junction between the second upper arm 28 and the second lower arm 24.

Each hub is formed with top, bottom, inner and outer regions. The top region of each hub 30, 40 is provided with an opening adapted for snuggly receiving the connecting end of the respective upper arms 18, 20. The bottom regions are also formed with openings for snuggly receiving the connecting ends of the lower arms 22, 24. Openings formed in the inner regions of the hubs are provided to fixedly accommodate the respective ends of the connecting element 16. The engaging ends of the proximal 32 and distal 34 support assemblies are movably/pivotably accommodated at the outer regions of the respective hub. The top and bottom regions of the hubs are movable/pivotable with respect to each other, so as to facilitate pivotable motion of the upper 12 and lower 14 frames about a longitudinal axis A-A of the rack 10 passing through the connecting element 16.

A controlling/adjustment arrangement is provided in each hub, so as to prevent movement of the upper and lower frames 12 and 14 relative to the longitudinal axis A-A, upon reaching their predetermined angular orientation. In this manner, such predetermined axial orientation of the upper frame 12 relative to the lower frame 14 can be fixed.

The upper ends of each lower arms 22, 24 are pivotably mounted within the hubs 30, 40 relative to the lower ends of the upper arms 18, 20. In this manner a transverse pivot axis A-A is defined coextensive with the connecting element 16 about which the upper frame 12 and the lower frame 14 are pivotable for movement between one operative position as shown in FIG. 1 and another operative position as shown in FIGS. 2 and 3 and vice versa.

The first hub assembly 30 and the second hub assembly 40 are formed with variable position engagement arrangements which are operable to selectively fix the axial orientation of the upper frame 12 relative to the hubs and thereby relative to the lower frame 14, when the lower and upper frames are moved to their operative extended and/or retracted positions. The variable position engagement arrangement is engaged, when predetermined angular orientation of the upper and lower frames with respect to each other is achieved. When the desired axial position of the upper frame 12 and the lower frame 14 relative each other has been attained, the user activates the engagement arrangement, so as to prevent accidental movement of the frames. On the other hand, when the upper and lower frames have to be repositioned, the engagement arrangement is deactivated so as to allow pivotal motion as discussed above. In one of the embodiments when activation or deactivation of the engagement arrangements is desired the user grasps upper frame 12 and lower frame 14 and pivots the same away or toward each other.

Figure 2:
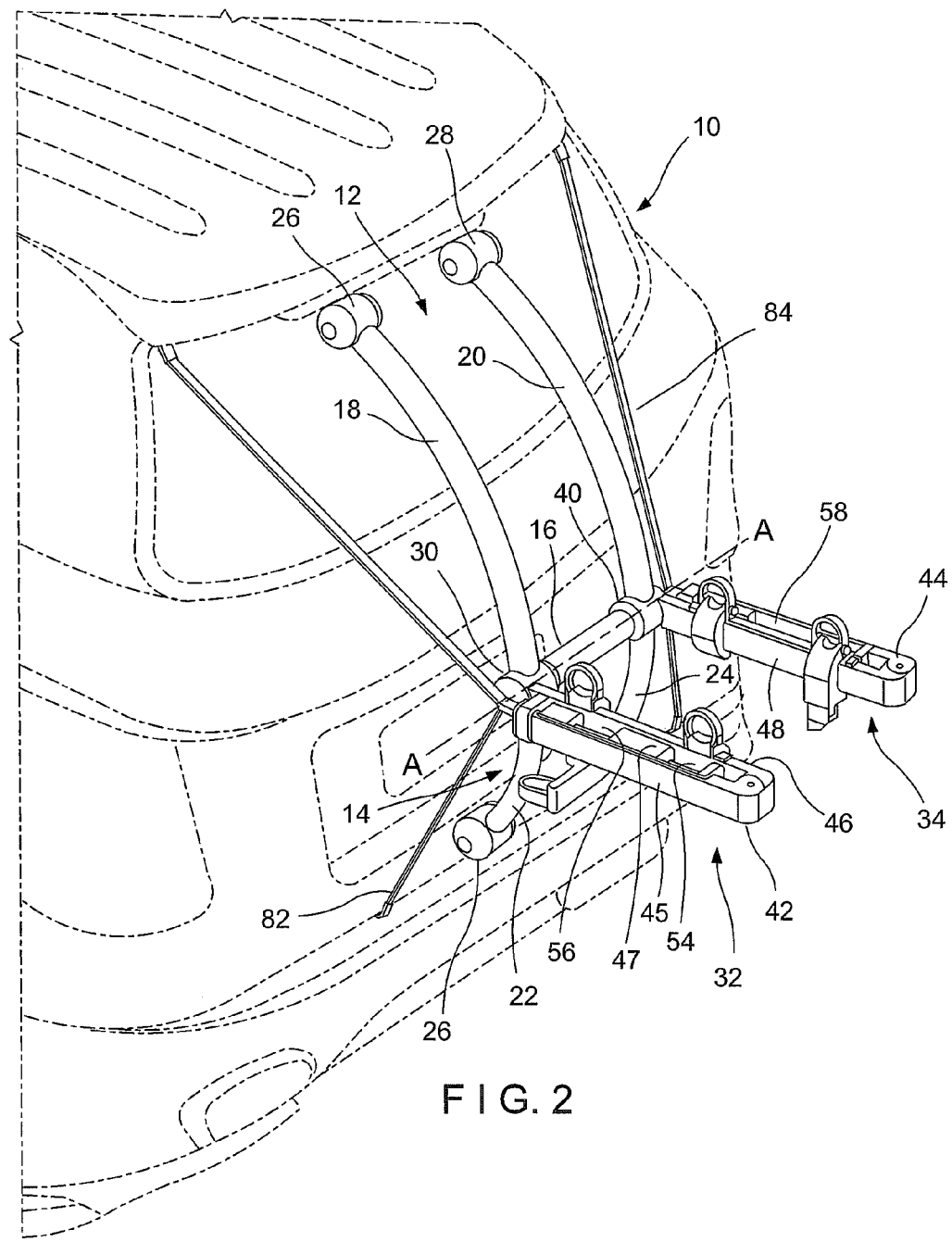
FIG. 2 is a perspective view of the equipment carrier mounted at the rear end of a sport utility vehicle.
Figure 3:
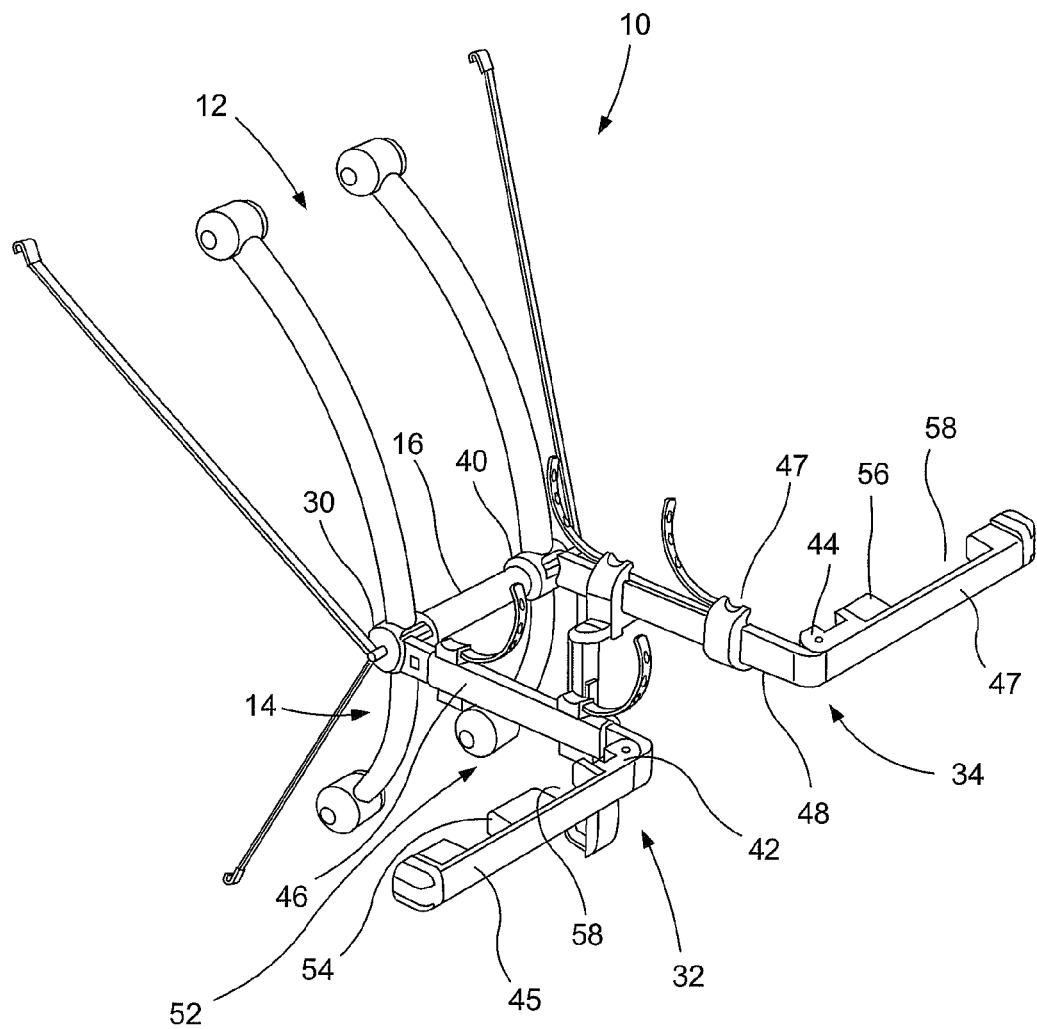
FIG. 3 is another view of the equipment carrier.

As best illustrated in at least FIGS. 2 and 3, the proximal equipment support assembly 32 comprises an elongated receiving element 46 pivotably associated with an engaging or locking element 45. An operational receiving space 52, adapted to receive skis and snowboards is formed between the locking and receiving elements. The receiving element 46 has an elongated configuration and extends between a connecting end movably connected to the hub 30 and a free end thereof. The engaging or locking element 45 is pivotably connected to the receiving element 46 at the pivotal unit 42 provided at the free end of the receiving element. Similar to the above-discussed manner, the distal support assembly 34 comprises an engaging or locking element 47 pivotably connected to an elongated receiving element 48. The receiving element 48 has an elongated configuration extending between a connecting end movably connected to the hub 40 and a free end thereof. The engaging element 47 is pivotably connected to the receiving element 48 at the pivotal unit 44.

In each equipment support assembly, a receiving operational space 52 is defined between an inner surface of the respective receiving and engaging elements. Resilient mounting inserts 54, 56 provided to engage or closely accommodate the skis and snowboards are attached to the interior of the locking and engaging elements, so as to be disposed within the operational receiving space 42. The inserts 54, 56 are made from a resilient/compressible material to assure the necessary friction and to prevent movement of the skis and snowboards, once they are locked within the interior space. Receiving cavities 68 adapted to accommodate skis or snowboards can be formed within the inserts 54, 56 of either the receiving or engaging/locking elements. In the embodiment of FIGS. 2 and 3, a plurality of inner cavities 58 extends inwardly from the inner surface into the body of the inserts.

Figure 5:
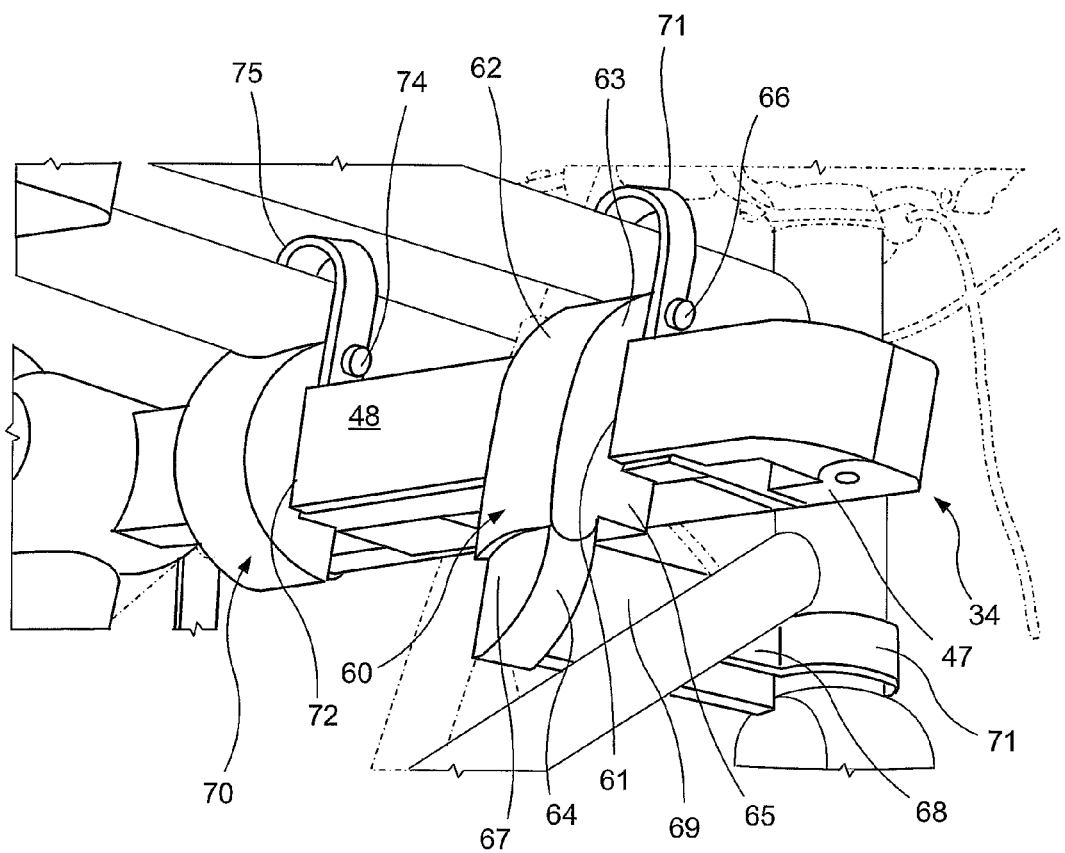
FIG. 5 is an enlarged detailed view thereof.

Referring now to FIGS. 4-8, wherein the equipment carrier of the invention for transportation of bicycles is best illustrated. In this embodiment the engaging/locking elements 45, 47 and the receiving elements 46, 48 are formed having substantially flat exterior surfaces. Other configuration of the exterior surfaces is also contemplated. Each equipment support assembly 32, 34 is provided with at least a pair of spaced from each other an anti-sway bicycle mounting bracket 60 and a restricting mounting bracket 70. The elbow-shaped anti-sway bracket 60 is formed with a connecting portion 62 and a stabilization portion 64. The connecting portion 62 is adapted for connection to or engagement with respective areas of the equipment support assemblies, whereas the stabilization portion 64 extends downwardly from and is pivotably associated with the connecting portion 62. An inner area of the connecting portion 62 is configured for close engagement with the exterior of either engaging/locking elements 45, 47 or the exterior of the receiving elements 46, 48 of the respective equipment support assemblies 32, 34. It is illustrated in FIG. 5 that in one embodiment of the invention, the inner area of the connecting portion 62 is formed having a C-shaped configuration with a substantially flat engaging part 61 interconnecting upper 63 and lower 65 transverse members. The elbow-type stabilization portion 64 is formed with a connecting part 67 and a stabilization part 69 positioned at an angle to each other. The connecting part 67 is pivotably connected to the lower member 65 of the connecting portion 62. The pivotal connection between the connecting 62 and stabilization 64 portions is resulted in the stabilization part 69 being adjusted between a position substantially perpendicular to the connecting portion 62 and the position, wherein the stabilization part is positioned at an angle to the connecting portion. This facilitates positioning of the bracket 60 within the bicycle frame and locks the frame, so as to prevent undesirable motion of the bicycle during the transportation. An upper mounting area 66 is provided at upper region of the connecting part 62, whereas a lower mounting area 68 is associated with a free end of the stabilization part 69. Each mounting area supports a flexible securing element or a securing strap 71 adapted for securing a bicycle frame to the anti-sway bicycle mounting bracket 60.

As best illustrated in at least FIGS. 4-8, an inner area 72 of the restricting mounting bracket 70 is also formed having a C-shaped configuration adapted for close engagement with the outer surfaces of either locking elements 45, 47 or receiving elements 46, 48 of the respective equipment support assemblies. A mounting area 74 is provided at an upper region of the bracket 70 and is adapted to support a flexible mounting element or a securing strap 75, which secures this mounting bracket to a respective portion of the bicycle frame.

Thus, the restricting mounting bracket 70 with the securing strap 75 are provided to prevent movement of the bicycle within the equipment carrier of the invention in the upward and downward directions. On the other hand, the pivotal elbow 69 extending from the anti-sway bicycle mounting bracket 60 toward the front fork of the bicycle and the respective flexible securing strap 71 surrounding a vertical part of the bicycle fork prevent the bicycle from swaying left and right.

As illustrated in at least FIGS. 4-8, in order to mount a bicycle on the equipment carrier 10 of the invention, the anti-sway mounting bracket 60 associated with one equipment support assembly and the restricting mounting bracket 70 associated with another equipment engagement assembly are utilized. As illustrated, in one embodiment of the invention (see FIG. 4, for example), the receiving element 48 of the distal equipment engagement assembly 34 is utilized to support the anti-sway mounting bracket 60. On the other hand, the respective restricting mounting bracket 70 is supported by the receiving element 46 of the proximal equipment support assembly 32. As further illustrated, the flexible mounting element 75 associated with the mounting bracket 70, engages a horizontal part C of the bicycle frame in the vicinity of a saddle. The flexible mounting element 71 associated with the upper mounting area 66 of the anti-sway bracket 60 engages a horizontal part D of the bicycle frame in the vicinity of a vertical part E of the front fork of the bicycle. The elbow portion 69 of the anti-sway mounting bracket 60 is positioned at an inclined part F of the bicycle frame. Actually the pivoting elbow 69 protruding from below the distal support assembly 34 supports the bicycle at the front fork G preventing it from swaying. The flexible mounting element 71 associated with the low mounting area 68 is provided at the front of the bicycle and engages the vertical part E of the fork at the inclined part F of the bicycle frame.

In a manner similar to the above-discussed, in order to mount a second bicycle within the equipment carrier 10 of the invention (see FIG. 6, for example), the receiving element 46 of the proximal equipment engagement assembly 32 is utilized to support the anti-sway mounting bracket 60. On the other hand, the respective restricting mounting bracket 70 is supported by the receiving element 48 of the distal support assembly 34. The flexible mounting element 75 associated with the restricting mounting bracket 70, engages the horizontal part C the second bicycle frame in the vicinity of a saddle. The flexible mounting element 71 associated with the upper mounting area 66 of the anti-sway bracket 60 engages the horizontal part of the second bicycle frame in the vicinity of the vertical area of the front fork of the bicycle. The elbow portion 69 of the anti-sway mounting bracket 60 is positioned at the inclined part of the bicycle frame. The flexible mounting element 71 associated with the low mounting area 68 engages the vertical part of the fork at the inclined part of the bicycle frame.

In operation, in order to support skis and/or snowboard for transportation by a vehicle, inner end of each engaging/locking elements 45, 47 is unlocked/released from its engagement with the locking mechanism provided in the vicinity of the respective hub. Then, the engaging elements 45, 47 are moved/pivoted within the respective pivotal units 42, 44, so as to expose the operational space 52 and make it accessible for receiving equipment such as skis, snowboards, etc. Then, ski and/or snowboards are positioned within the inner receiving cavities 58. The mounting process is completed by pivotal movement of the engaging elements 45, 47 in the direction of the receiving elements 46, 48, so as to close the operational space 52 and to lock the equipment for transportation by fixing the end of the engaging elements within the locking units.

As best illustrated in FIGS. 1 and 2, the carrier 10 is secured to the automobile by at least two pairs of adjustable length restraining straps. For example, a lower pair of straps 82 is connected to a lower part of the vehicle rear or a bumper B, and an upper pair of straps 84 is connected to an upper part of the vehicle rear or the front edge of the trunk lid L. The straps extend from each hub 30, 40, for securing carrier 10 of the invention to vehicle. The straps may be secured to the hubs in any conventional manner or may be connected to any other area of bicycle rack 10. The upper and lower frames 12, 14 are connected together at the intersection of the arms and are fixed at a particular angle relative to each other. The bicycles are supported on the carrier 10 by resting the cross bar or top tube of the bicycle frame on the support assemblies 32, 34. The bicycle frame generally lies against the element of the carrier, away from the vehicle. Additional straps, as well as the anti-sway 60 and the restricting mounting brackets 70 may be used to secure the bicycle in place during road travel of the vehicle.

With the configuration of the upper arms and the lower arms as shown and described, arms define a lower engagement area, located below the upper engagement area defined by upper arms, which is adapted for engagement with a vehicle at a location below upper frame end member.

Figure 6:
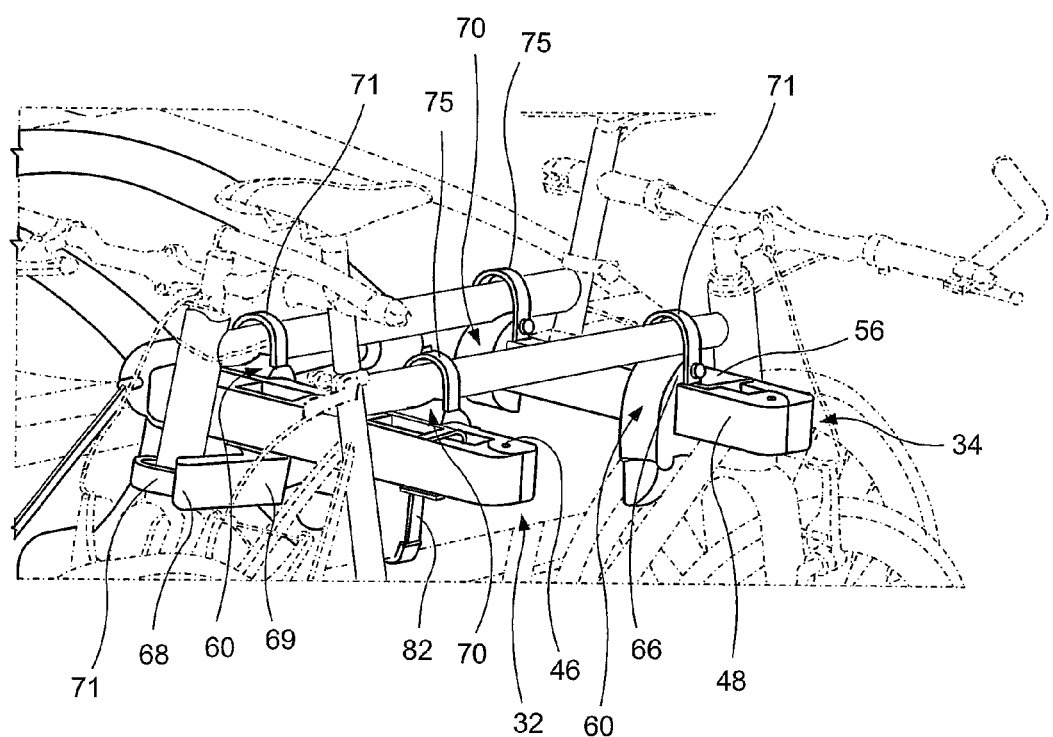
FIG. 6 is another view similar to the view of FIG. 4.
Figure 8:
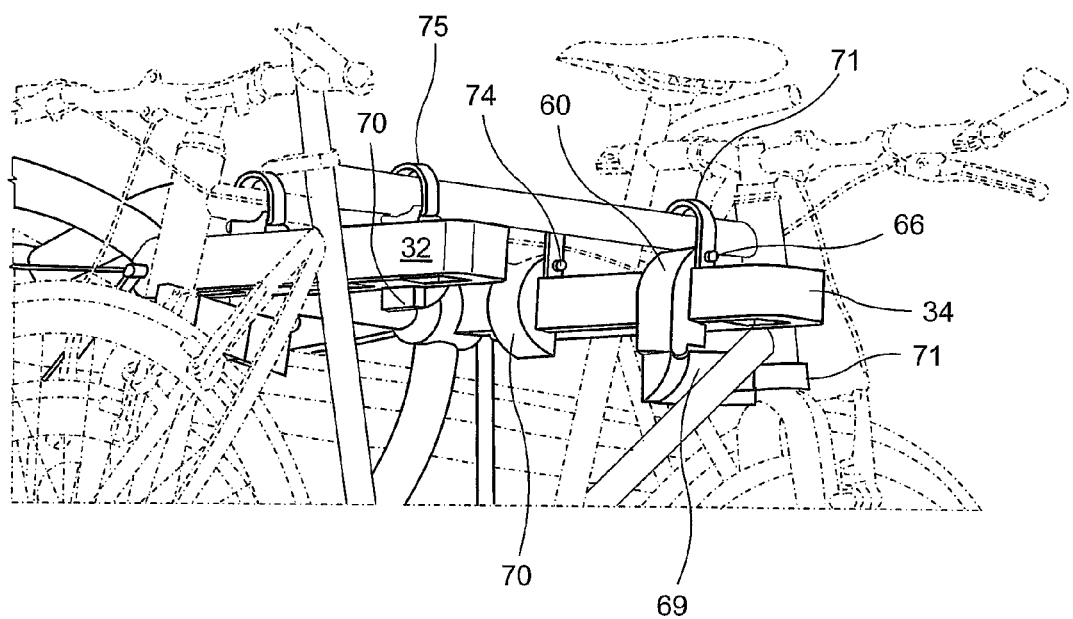
FIG. 8 is a further view similar to that of FIG. 6.

Upper arms 18, 20 cooperate with lower arms 22, 24 and the respective hubs to provide axial movement of upper frame 12 relative to lower frame 14. In this manner, the upper engagement area defined by upper arms can be moved to an extended position as shown in FIGS. 1-3, which is adapted for use with a vehicle having a relatively flat rear end, such as a van, station wagon, minivan, sport utility vehicle or the like. The upper engagement area defined by upper arms can also be moved to a retracted position as shown in FIGS. 4-6, which is adapted for use with a trunk-type vehicle such as a sedan or coupe. These vehicles have a horizontal engagement surface defined by the top wall of the trunk of vehicle, as well as a vertical engagement surface defined by the bumper area of vehicle.

The axial position of the upper frame 12 and the lower frame 14 can be adjusted to any position as desired, while enabling to be selectively extended for use and collapsed for storage. When the equipment carrier 10 is not in use, lower frame 14 and upper frame 12 are moved by means of the hubs 30, 40 to their collapsed inoperative position, so as to shorten and minimize the overall length of carrier to facilitate storage.

While the invention has been shown and described with respect to a particular embodiment, it is understood that various alternatives and modifications are contemplated as being within the scope of the present invention and covered by the appended claims. Such alternatives and modifications include, but are not limited to, the following. While the invention has been described in connection with the combination ski, snow board, bicycle carrier, it is understood that the invention may be incorporated in any type of carrier adapted for removable mounting to a vehicle and for supporting any type of equipment on the vehicle during transport. In addition, while upper frame 12 and lower frame 14 are illustrated as being in the form of U-shaped frames having a pair of arms, it is understood that the invention is capable of being used in connection with any type of frame arrangement, e.g. one in which the upper and/or lower frames are formed of a single arm or a series of arms.

The invention claimed is:

1. A combination equipment carrier adapted to be mounted at a rear of a vehicle, comprising:
    an upper frame including first and second upper arms spaced from each other;
    a lower frame including first and second lower arms spaced from each other;
    a transverse connecting element interconnecting said upper frame and said lower frame;
    a first hub, receiving a first end of said transverse connecting element, the first upper arm and the first lower arm being pivotably connected to each other at said first hub;
    a second hub, receiving a second end of said transverse connecting element, the second upper arm and the second lower arm being pivotably connected to each other at said second hub;
    a proximal support assembly movably arranged at the first hub at a junction between the first upper arm and the first lower arm, said proximal support assembly comprising a first elongated receiving element extending outwardly from said first hub and a first engaging/locking element, said first elongated receiving element including a connecting end movably connected to said first hub, and a free end including a first pivotal unit pivotally connecting said first engaging/locking element to said first receiving element, said first pivotal unit having a substantially vertically oriented pivotal axis, said first engaging/locking element is pivoted in a horizontal plane about said substantially vertically oriented pivotal axis, so that a substantial operational receiving space adapted to receive equipment is formed during the horizontal movement of said first engaging/locking element relative to said first receiving element;
    a distal support assembly movably arranged at the second hub at a junction between the second upper arm and the second lower arm, said distal support assembly being spaced apart from said proximal support assembly;
    wherein each of said proximal and distal support assemblies includes at least one anti-sway bicycle mounting bracket and at least one restricting mounting bracket, the anti-sway bicycle mounting bracket and the restricting mounting bracket being spaced from each other.

2. The carrier of claim 1, wherein:
    the distal support assembly comprises a second elongated receiving element extending outwardly from said second hub and a second engaging/locking element,
    said second elongated receiving element including a second connecting end movably connected to said second hub, and a free end, including a second pivotal unit pivotally connecting said second engaging/locking element to said second receiving element,
    said second pivotal unit having a substantially vertically oriented pivotal axis, wherein said second engaging/locking element is pivoted in a horizontal plane about said substantially vertically oriented pivotal axis, so that a substantial operational receiving space adapted to receive equipment is formed during the horizontal movement of said second engaging/locking element relative to said second receiving element.

3. The Carrier of claim 2, wherein, in a first orientation of said distal support assembly, said second engaging/locking element is disposed parallel to said second elongated receiving element, and in a second orientation of said distal support assembly, said second engaging/locking element is pivoted in a horizontal plane about said substantially vertically oriented pivotal axis of said second pivotal unit to be angled with respect to said second elongated receiving element in a direction facing away from said proximal support assembly.

4. The carrier of claim 2, wherein said first and said second engaging/locking elements have flat exterior surfaces.

5. The carrier of claim 4, wherein said first and said second receiving elements have flat exterior surfaces.

6. The carrier of claim 1, wherein:
    each of said first and second hubs includes top, bottom, inner and outer regions;
    the top region of each of said first and second hubs is formed with an opening adapted to receive a connecting end of a respective one of said first and second upper arms;
    the bottom region of each of said first and second hubs is formed with an opening adapted to receive a connecting end of a respective one of said first and second lower arms; and
    the inner region of each of the first and second hubs is adapted to fixedly accommodate a respective one of said first and second ends of the transverse connecting element.

7. The carrier of claim 6, wherein the outer region of each of said first and second hubs movably accommodates an engaging end of a corresponding one of the proximal and distal support assemblies, and wherein said first and second hubs are movable so as to provide pivotal motion of the upper and lower frames about a longitudinal axis extending along the transverse connecting element.

8. The carrier of claim 1, wherein each said anti-sway bicycle mounting bracket has an elbow-shaped configuration including a connecting portion and a stabilization portion positioned at an angle to each other, wherein the connecting portion is connected to one of said proximal and said distal support assemblies, and the stabilization portion extends downwardly from, and is pivotally associated with, the connecting portion.

9. The carrier of claim 8, wherein, in each said anti-sway bicycle mounting bracket:
the stabilization portion is pivotably connected to a lower area of the connecting portion;
an upper mounting area is provided at an upper region of the connecting portion;
a lower mounting area is formed at a free end of the stabilization portion; and
a flexible mounting element is provided at said lower mounting area for securing the anti-sway bicycle mounting bracket to a portion of a bicycle frame.

10. The carrier of claim 9, wherein said restricting mounting bracket includes:
a C-shaped inner area adapted for engagement with an outer surface of a corresponding one of said first and second engaging/locking elements or with a portion of a corresponding one of said first and second receiving elements;
a mounting area, disposed at an upper region of the restricting mounting bracket, so as to support a second flexible mounting element suitable for securing the restricting mounting bracket to a portion of the bicycle frame.

11. The Carrier of claim 1, wherein, in a first orientation of said proximal support assembly, said first engaging/locking element is disposed parallel to said first elongated receiving element, and in a second orientation of said proximal support assembly, said first engaging/locking element is pivoted in a horizontal plane about said substantially vertically oriented pivotal axis of said first pivotal unit to be angled with respect to said first elongated receiving element in a direction facing away from said distal support assembly.

12. A method of supporting at least one bicycle by a transportation carrier, said transportation carrier comprising:
a proximal support assembly movably arranged at a first hub, said proximal support assembly comprising a first elongated receiving element extending outwardly from said first hub and a first engaging/locking element, said first elongated receiving element including a connecting end movably connected to said first hub, and a free end including a first pivotal unit pivotally connecting said first engaging/locking element to said first receiving element, said first pivotal unit having a substantially vertically oriented pivotal axis, a distal support assembly movably arranged at a second hub, and being spaced from said proximal support assembly; each of said proximal and distal support assemblies including an anti-sway bicycle mounting bracket and a restricting mounting bracket spaced from said anti-sway bicycle mounting bracket; each said anti-sway bicycle mounting bracket having a connecting portion and a stabilization portion positioned at an angle relative to each other; each said connecting portion is connected to a corresponding one of said proximal and said distal support assembly, each said stabilization portion extends downwardly from, and is pivotal about, the corresponding connecting portion; each said restricting mounting bracket includes a flexible mounting element; wherein the at least one bicycle comprises a frame having a horizontal part, an inclined part positioned at an angle to the horizontal part, a front fork and a saddle;
said method comprising the steps of:
pivoting said first engaging/locking element in a substantially horizontal plane about said substantially vertically oriented pivotal axis, so that an operational receiving space adapted to receive equipment is formed during the horizontal movement of said first engaging/locking element relative to said first receiving element;
selecting a first said anti-sway bicycle mounting bracket associated with one of said proximal and distal support assemblies and a first said restricting mounting bracket associated with the other one of said proximal and distal support assemblies;
connecting said first restricting mounting bracket to the horizontal part of the bicycle frame in the vicinity of the saddle to secure the horizontal part of the bicycle frame; and
connecting said first anti-sway bicycle mounting bracket to the bicycle by connecting the connecting portion of the first anti-sway bicycle mounting bracket to the horizontal portion of the bicycle frame and positioning the stabilization portion of the first anti-sway bicycle mounting bracket adjacent the inclined part of the bicycle frame, so that the stabilization portion supports the bicycle at the front fork, thereby preventing the bicycle from swaying.

13. The method of claim 12, further comprising the steps of:
preventing vertical movement of the bicycle within the transportation carrier by engaging the flexible mounting element of the first restricting mounting bracket to a vertical part of the front fork; and
preventing side-to-side swaying of the bicycle by extending the stabilization portion from the first anti-sway bicycle mounting bracket toward the front fork of the bicycle and by wrapping the flexible mounting element of the first restricting mounting bracket around the vertical part of the front fork.

14. The method of claim 13, wherein
the distal support assembly comprises a second elongated receiving element extending outwardly from said second hub and a second engaging/locking element, said second elongated receiving element including a second connecting end movably connected to said second hub, and a free end, including a second pivotal unit pivotally connecting said second engaging/locking element to said second receiving element, said second pivotal unit having a substantially vertically oriented pivotal axis, said method further comprising the step of:
pivoting said second engaging/locking element in a horizontal plane about said substantially vertically oriented pivotal axis, so that a substantial operational receiving space adapted to receive equipment is formed during the horizontal movement of said second engaging/locking element relative to said second receiving element.

15. The method of claim 13, wherein each said restricting mounting bracket further includes a C-shaped inner area and wherein said method further comprises the steps of:
mounting a second bicycle within the transportation carrier by:

selecting a second said anti-sway bicycle mounting bracket associated with said other one of said proximal and distal support assemblies and a second said restricting mounting bracket associated with said one of said proximal and distal support assemblies;

connecting said second restricting mounting bracket to a horizontal portion of a second bicycle frame of the second bicycle in the vicinity of a saddle thereof;

connecting said second anti-sway bicycle mounting bracket to the second bicycle by connecting the connecting portion of the second anti-sway bicycle mounting bracket to the horizontal portion of the second bicycle frame and positioning the stabilization portion of the second anti-sway bicycle mounting bracket adjacent an inclined part of the second bicycle frame, so that the stabilization portion supports the second bicycle at a front fork thereof, thereby preventing the second bicycle from swaying.

16. The method of claim 15, further comprising the steps of:

preventing vertical movement of the second bicycle within the transportation carrier by engaging the flexible mounting element of the second restricting mounting bracket to a vertical part of the front fork of the second bicycle; and preventing side-to-side swaying of the second bicycle by extending the stabilization portion from the second anti-sway bicycle mounting bracket toward the front fork of the second bicycle and by wrapping the flexible mounting element of the second restricting mounting bracket around the vertical part of the front fork of the second bicycle.

* * * * *